United States Patent
Kuo

(10) Patent No.: US 11,144,245 B2
(45) Date of Patent: Oct. 12, 2021

(54) MEMORY CONTROL METHOD, MEMORY STORAGE DEVICE AND MEMORY CONTROL CIRCUIT UNIT

(71) Applicant: PHISON ELECTRONICS CORP., Miaoli (TW)

(72) Inventor: Che-Yueh Kuo, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 1 day.

(21) Appl. No.: 16/660,807

(22) Filed: Oct. 23, 2019

(65) Prior Publication Data

US 2021/0064284 A1    Mar. 4, 2021

(30) Foreign Application Priority Data

Aug. 28, 2019  (TW) .................................. 108130911

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 10,418,053 B1* | 9/2019 | Ehrlich | G11B 5/012 |
| 2010/0161887 A1* | 6/2010 | Nakazumi | G06F 12/0246 |
| | | | 711/103 |
| 2014/0289449 A1* | 9/2014 | Ogata | G06F 3/064 |
| | | | 711/103 |
| 2015/0098271 A1* | 4/2015 | Lasser | G11C 16/10 |
| | | | 365/185.11 |
| 2017/0160932 A1* | 6/2017 | Thakkar | G06F 11/1068 |

* cited by examiner

*Primary Examiner* — Elias Mamo
(74) *Attorney, Agent, or Firm* — JCIPRNET

(57) ABSTRACT

A memory control method is disclosed. The method includes: determining a mode for reading first data in a first management unit as a first mode or a second mode according to a data dispersion degree of the first data; reading the first data from the first management unit according to a physical distribution of the first data if the mode for reading the first data is determined as the first mode; and reading the first data from the first management unit according to a logical distribution of the first data if the mode for reading the first data is determined as the second mode. Furthermore, a memory storage device and a memory control circuit unit are also disclosed.

21 Claims, 13 Drawing Sheets

MEMORY CONTROL METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 108130911, filed on Aug. 28, 2019. The entirety of the above-mentioned patent application is hereby incorporated by reference herein and made a part of this specification.

BACKGROUND

Technical Field

The disclosure relates to a memory control technique, and more particularly, to a memory control method, a memory storage device and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

In general, a memory storage device can release a new spare physical unit by a data merging operation (e.g., a garbage collection procedure). The new spare physical unit can be used to store new data from a host system. However, in the data merging operation, if a logical distribution of valid data stored in a source unit is too disperse, the operation of collecting the valid data from the source unit will take too much time, thereby reducing an execution efficiency of the data merging operation overall.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a memory control method, a memory storage device and a memory control circuit unit, which can dynamically determine or adjust a mode for reading data to increase the execution efficiency of the data merging operation.

An exemplary embodiment of the disclosure provides a memory control method for a rewritable non-volatile memory module. The rewritable non-volatile memory module includes a plurality of management units. The memory control method includes: determining a mode for reading first data in a first management unit among the plurality of management units as a first mode or a second mode according to a data dispersion degree of the first data; reading the first data from the first management unit according to a physical distribution of the first data if the mode for reading the first data is determined as the first mode; and reading the first data from the first management unit according to a logical distribution of the first data if the mode for reading the first data is determined as the second mode.

An exemplary embodiment of the disclosure further provides a memory storage device, which includes a connection interface unit, a rewritable non-volatile memory module and a memory control circuit unit. The connection interface unit is configured to couple to a host system. The rewritable non-volatile memory module includes a plurality of management units. The memory control circuit unit is coupled to the connection interface unit and the rewritable non-volatile memory module. The memory control circuit unit is configured to determine a mode for reading first data in a first management unit among the plurality of management units as a first mode or a second mode according to a data dispersion degree of the first data. The memory control circuit unit is further configured to send a first read command sequence to instruct a reading of the first data from the first management unit according to a physical distribution of the first data if the mode for reading the first data is determined as the first mode. The memory control circuit unit is further configured to send a second read command sequence to instruct a reading of the first data from the first management unit according to a logical distribution of the first data if the mode for reading the first data is determined as the second mode.

An exemplary embodiment of the disclosure further provides a memory control circuit unit, which is configured to control a rewritable non-volatile memory module. The rewritable non-volatile memory module includes a plurality of management units. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to determine a mode for reading first data in a first management unit among the plurality of management units as a first mode or a second mode according to a data dispersion degree of the first data. The memory management circuit is further configured to send a first read command sequence to instruct a reading of the first data from the first management unit according to a physical distribution of the first data if the mode for reading the first data is determined as the first mode. The memory management circuit is further configured to send a second read command sequence to instruct a reading of the first data from the first management unit according to a logical distribution of the first data if the mode for reading the first data is determined as the second mode.

Based on the above, according to the data dispersion degree of the first data stored in the first management unit, the mode for reading the first data in the first management unit can be determined as the first mode or the second mode. Then, if the mode for reading the first data is determined as the first mode, the first data is read from the first management unit according to the physical distribution of the first data. Alternatively, if the mode for reading the first data is determined as the second mode, the first data is read from the first management unit according to the logical distribution of the first data. In other words, by dynamically determining or adjusting the mode for reading the first data, the execution efficiency of the data merging operation can be increased.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

To make the aforementioned more comprehensible, several embodiments accompanied with drawings are described in detail as follows.

DESCRIPTION OF THE EMBODIMENTS

Figure 1:
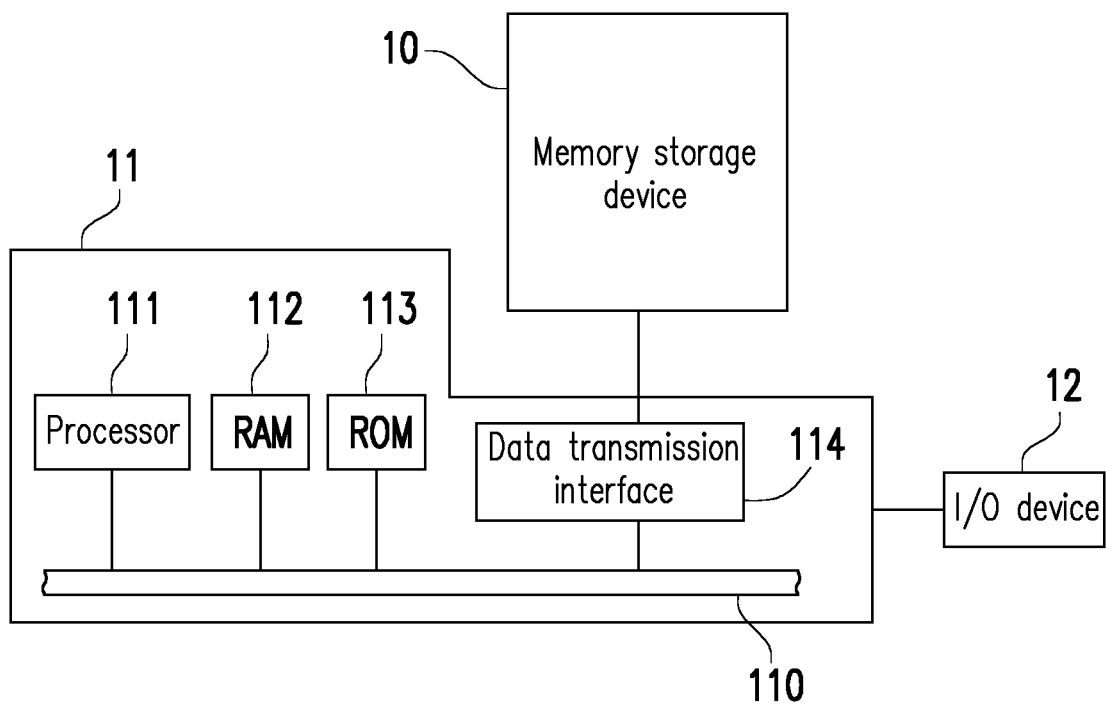
FIG. 1 is a schematic diagram illustrating a host system, a memory storage device and an I/O (input/output) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
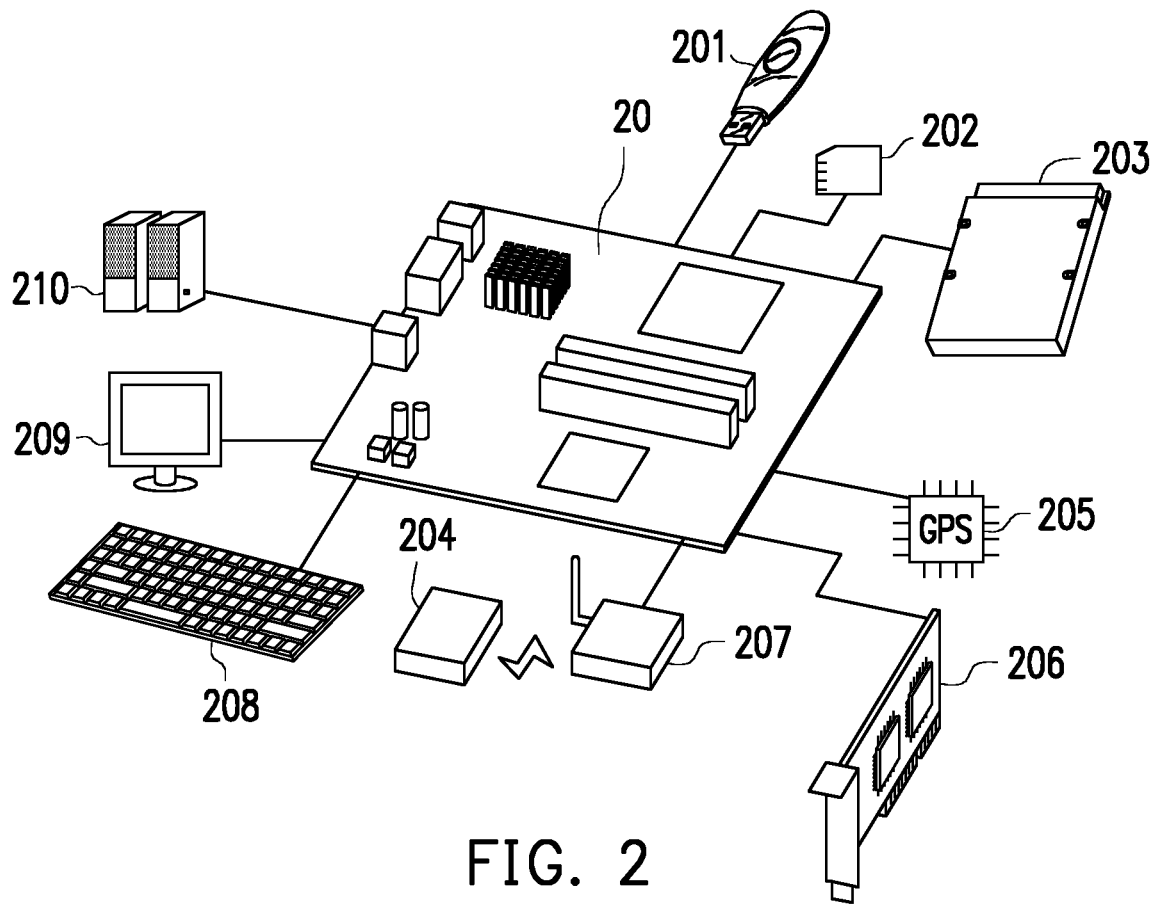
FIG. 2 is a schematic diagram illustrating a host system, a memory storage device and an I/O device according to another exemplary embodiment of the disclosure.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the disclosure.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In this exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
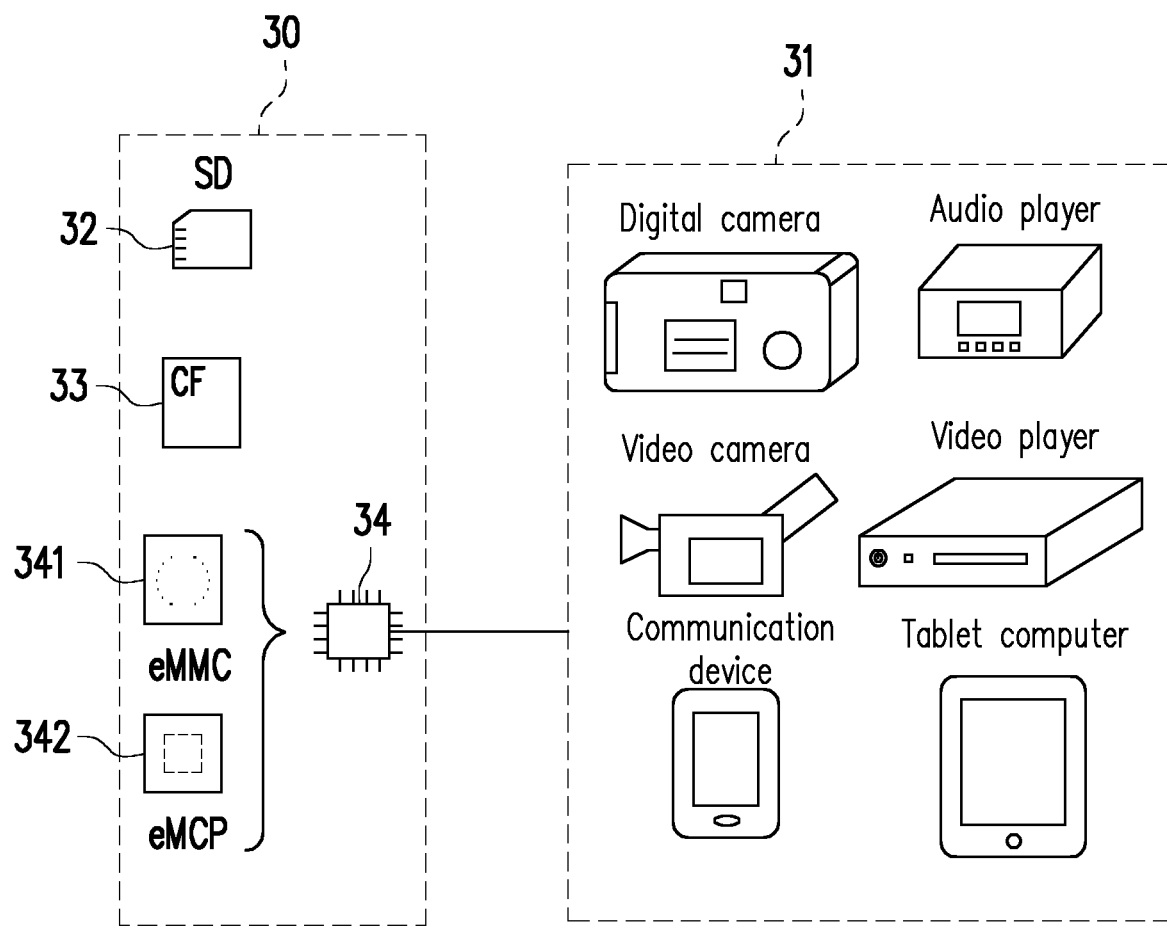
FIG. 3 is a schematic diagram illustrating a host system and a memory storage device according to another exemplary embodiment of the disclosure.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 31, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
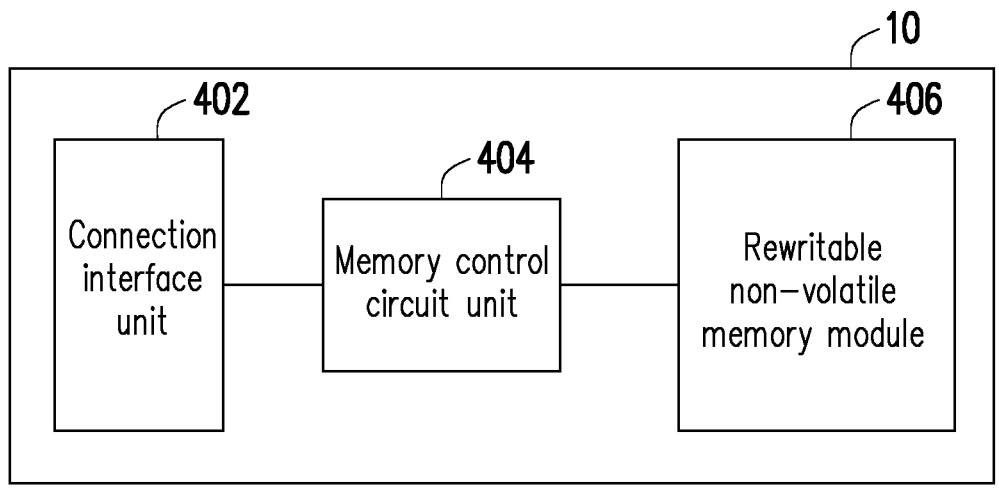
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. The memory storage device 10 can communicate with the host system 11 through the connection interface unit 402. In this exemplary embodiment, the connection interface unit 402 is compatible with a SATA (Serial Advanced Technology Attachment) standard. Nevertheless, it should be understood that the disclosure is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 may be distributed outside of a chip containing the memory control circuit unit 404.

The memory control circuit unit 404 is configured to execute a plurality of logic gates or control commands which are implemented in a hardware form or in a firmware form and execute operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quad Level Cell) NAND flash memory module (i.e., a flash memory module capable of storing four bits in one memory cell), other flash memory modules or other memory modules with the same characteristics.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". By changing the threshold voltage, each of the memory cells in the rewritable non-volatile memory module 406 can have a plurality of storage states. The storage state to which the memory cell belongs may be determined by applying a read voltage to the memory cell, so as to obtain the one or more bits stored in the memory cell.

In this exemplary embodiment, the memory cells of the rewritable non-volatile memory module 406 can constitute a plurality of physical programming units, and the physical programming units can constitute a plurality of physical erasing units. Specifically, the memory cells on the same word line can constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit may be a physical page or a physical sector. If the physical programming unit is the physical page, the physical programming unit can include a data bit area and a redundancy bit area. The data bit area contains multiple physical sectors configured to store user data, and the redundant bit area is configured to store system data (e.g., management data such as an error correcting code, etc.). In this exemplary embodiment, the data bit area contains 32 physical sectors, and a size of each physical sector is 512 bytes (B). However, in other exemplary embodiments, the data bit area may also contain 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
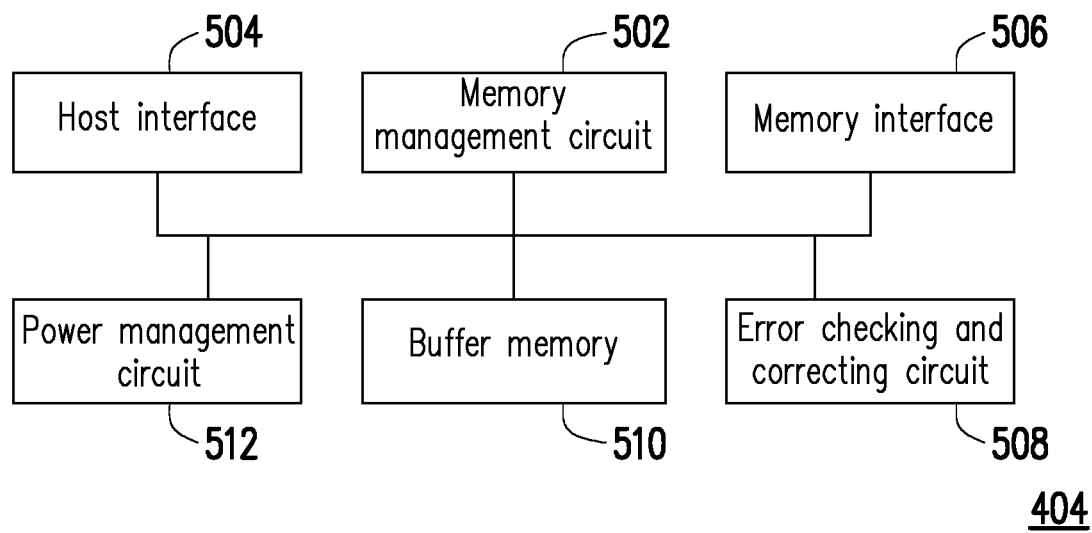
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. When the memory storage device 10 operates, the control commands are executed to execute various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to execute operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to execute operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of a memory cell group of the rewritable non-volatile memory module 406. The memory writing circuit is configured to send a write command sequence to the rewritable non-volatile memory module 406 so as to write data into the rewritable non-volatile memory module 406. The memory reading circuit is configured to send a read command sequence to the rewritable non-volatile memory module 406 so as to read data from the rewritable non-volatile memory module 406. The memory erasing circuit is configured to send an erase command sequence to the rewritable non-volatile memory module 406 so as to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes and instructs the rewritable non-volatile memory module 406 to execute the corresponding operations, such as writing, reading and erasing. In an exemplary embodiment, the memory management circuit 502 may further send command sequences of other types to instruct the rewritable non-volatile memory module 406 to execute the corresponding operations.

The host interface 504 is coupled to the memory management circuit 502. The memory management circuit 502 can communicate with the host system 11 through the host interface 504. The host interface 504 may be used to receive and identify commands and data transmitted by the host system 11. For example, the commands and the data transmitted by the host system 11 may be transmitted to the memory management circuit 502 via the host interface 504. In addition, the memory management circuit 502 can transmit data to the host system 11 via the host interface 504. In this exemplary embodiment, the host interface 504 is compatible with the SATA standard. However, it should be understood that the disclosure is not limited thereto, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for executing various memory operations (e.g., changing read voltage levels or performing a garbage collection operation). These command sequences are generated by the memory management circuit 502 and transmitted to the rewritable non-volatile memory module 406 via the memory interface 506, for example. The command sequences may include one or more signals, or data transmitted in the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to execute an error checking and correcting operation to ensure the correctness of data. Specifically, when the memory management circuit 502 receives the writing command from the host system 11, the error checking and correcting circuit 508 generates an error correcting code (ECC) or an error detecting code (EDC) for data corresponding to the writing command, and the memory management circuit 502 writes data and the ECC or the EDC corresponding to the writing command to the rewritable non-volatile memory module 406. Then, when the memory management circuit 502 reads the data from the rewritable non-volatile memory module 406, the corresponding ECC and/or the EDC are also read, and the error checking and correcting circuit 508 executes the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

In an exemplary embodiment, the rewritable non-volatile memory module 406 of FIG. 4 is also known as a flash memory module, the memory control circuit unit 404 is also known as a flash memory controller for controlling the flash memory module, and/or the memory management circuit 502 of FIG. 5 is also known as a flash memory management circuit.

Figure 6:
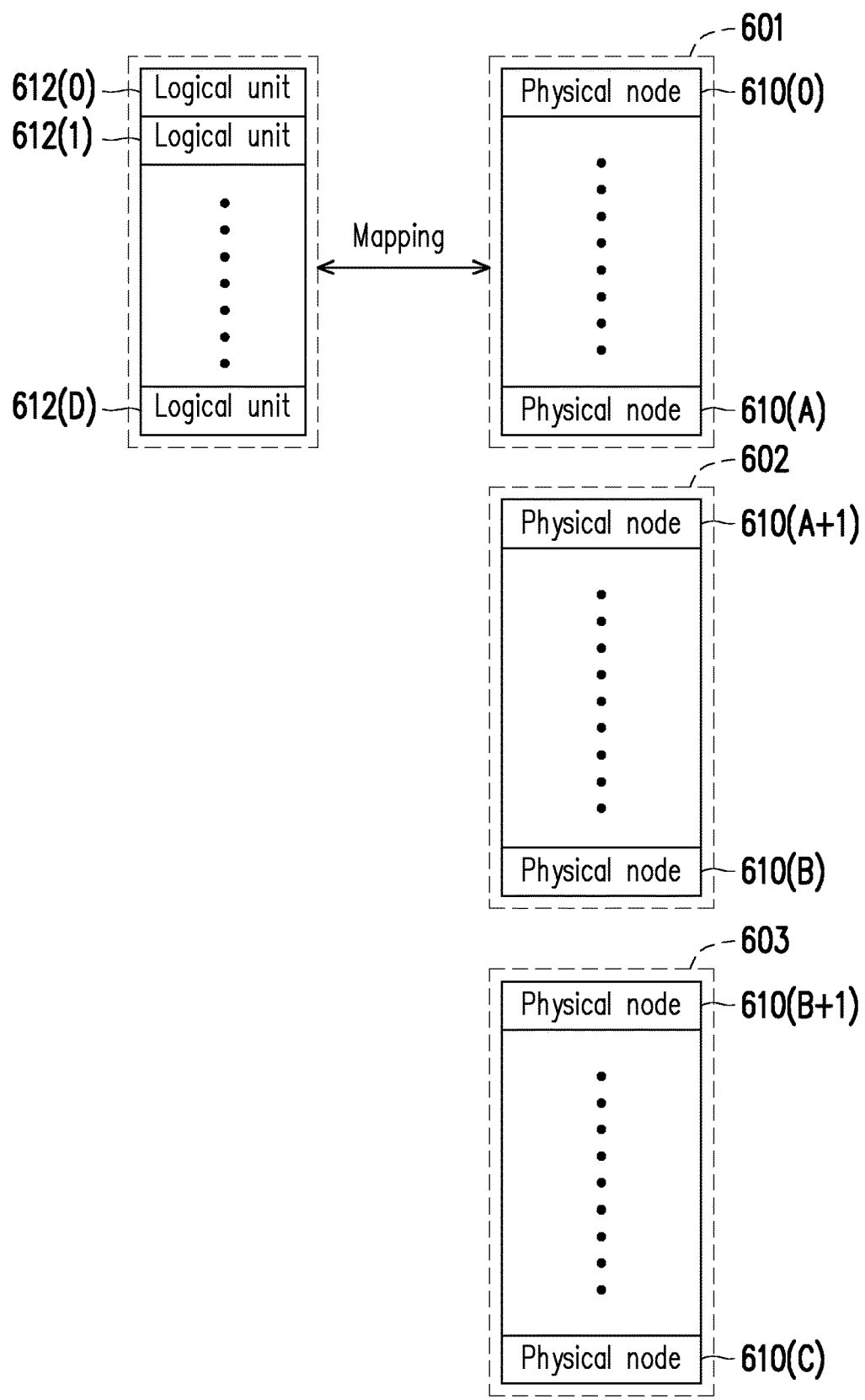
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure. Referring to FIG. 6, the memory management circuit 502 can logically group physical nodes 610(0) to 610(C) of the rewritable non-volatile memory module 406 into a storage area 601, a spare area 602 and a system area 603. The physical nodes 610(0) to 610(A) in the storage area 601 are stored with data. For example, the physical nodes 610(0) to 610(A) in the storage area 601 can store valid data and invalid data. The physical nodes 610(A+1) to 610(B) in the spare area 602 are not yet stored with data (e.g., the valid data). The physical nodes 610(B+1) to 610(C) in the system area 603 are configured to store system data, such as a logical-to-physical mapping table, a bad block management table, a device model or management data of other types.

One physical node can contain one or more physical addresses. One physical address can be composed of a plurality of memory cells. When data is to be stored, the memory management circuit 502 can select at least one physical node from the physical nodes 610(A+1) to 610(B) in the spare area 602 and store data from the host system 11 or from at least one physical node in the storage area 601 into the selected physical node. Meanwhile, the selected physical node is associated with the storage area 601. In addition, after one physical node in the storage area 601 is erased, that erased physical node is re-associated with the spare area 602.

The memory management circuit 502 can assigns logical units 612(0) to 612(D) for mapping to the physical nodes 610(0) to 610(A) in the storage area 601. One logical unit may contain one or more logical addresses. Each of the logical units 612(0) to 612(D) can also be mapped to one or more physical nodes. It should be noted that, the memory management circuit 502 may not assign any logical unit for mapping to the system area 603, so as to prevent the system data stored in the system area 603 from being changed by users.

The memory management circuit 502 can record a mapping relation (a.k.a. logical-to-physical address mapping information or mapping information) between the logical units and the physical nodes into at least one logical-to-physical mapping table. The logical-to-physical mapping table is stored in the physical nodes 610(B+1) to 610(C) in the system area 603. When the host system 11 intends to read data from the memory storage device 10 or write data into the memory storage device 10, the memory management circuit 502 can execute a data accessing operation on the memory storage device 10 according to the logical-to-physical mapping table.

It is noted that in the following description, some terms may be replaced with corresponding abbreviations for ease of reading (see Table 1).

TABLE 1

| rewritable non-volatile memory module | RNVM module |
|---|---|
| memory management circuit | MMC |
| management unit | MU |
| physical node | PN |
| Physical unit | PU |
| Logical unit | LU |

The MMC 502 can manage and access the PNs in the RNVM module 406 based on MUs. One MU is also known as a virtual block (VB). One MU can contain a plurality of PNs. For example, one MU can cover the PNs belonging to one or more planes (a.k.a. memory planes) and/or one or more chip enables (CE) in the RNVM module 406. Further, one MU can be associated with the storage area 601, the spare area 602 or the system area 603. The MU belonging to the spare area 602 is also known as a spare MU. The MU belonging to the storage area 601 is also known as a non-spare MU.

It should be noted that, the valid data is the latest data belonging to one specific LU, and the invalid data is not the latest data belonging to any LU. For example, if the host system 11 stores new data into one specific LU to overwrite old data originally stored in that specific LU (i.e., update the data of that specific LU), this new data stored in the storage area 601 is the latest data belonging to that specific LU and marked as valid, whereas the old data being overwritten may still be stored in the storage area 601 but marked as invalid.

In this exemplary embodiment, if data belonging to one specific LU is updated, a mapping relation between that specific LU and the PN stored with the old data belonging to that specific LU will be removed, and a mapping relation between that specific LU and the PN stored with the latest data belonging to that LU will be established. However, in another exemplary embodiment, if data belonging to one specific LU is updated, a mapping relation between that specific LU and the PN stored with the old data belonging to that LU can still be maintained.

When the memory storage device 10 leaves the factory, a total number of the MUs belonging to the spare area 602 is a predetermined number (e.g., 30). During operation of the memory storage device 10, there will be increasingly more MUs being selected from the spare area 602 and associated with the storage area 601 for storing data (e.g., the user data from the host system 11). Accordingly, the total number of the MUs belonging to the spare area 602 will gradually decrease with use of the memory storage device 10 over time.

During operation of the memory storage device 10, the MMC 502 can continuously update the total number of the MUs belonging to the spare area 602. The MMC 502 can execute a data merging operation according to the number of the MUs in the spare area 602 (i.e., a total number of the spare MUs). For example, the MMC 502 can determine whether the total number of the MUs belonging to the spare area 602 is less than or equal to a threshold value (a.k.a. a first threshold value). The first threshold value may be, for example, 2 or a greater value (e.g., 10), which is not particularly limited by the disclosure. If the total number of the MUs belonging to the spare area 602 is less than or equal to the first threshold value, the MMC 502 can execute the data merging operation. In an exemplary embodiment, the data merging operation is also known as a garbage collection operation.

In the data merging operation, the MMC 502 can select at least one MU from the storage area 601 as a source unit and select at least one MU from the spare area 602 as a recycling unit. The MMC 502 can send at least one command sequence to instruct the RNVM module 406 to copy the valid data from the MU served as the source unit to the MU served as the recycling unit. The MU served as the recycling unit and fully written with the valid data can be associated with the storage area 601. After the valid data stored by one specific MU is completely copied into the recycling unit, that specific MU can be erased and associated with the spare area 602. In an exemplary embodiment, the operation of re-associating one specific MU from the storage area 601 back to the spare area 602 (or the operation of erasing one MU) is also known as releasing one spare MU. By performing the data merging operation, one or more spare MUs will be released so the total number of the MUs belonging to the spare area 602 can be gradually increased.

After the data merging operation is activated, if the MUs belonging to the spare area 602 match a specific condition, the data merging operation can be stopped. For example, the MMC 502 can determine whether the total number of the MUs belonging to the spare area 602 is greater than or equal to one threshold value (also referred to as a second threshold value hereinafter). For example, the second threshold value can be greater than or equal to the first threshold value. If the total number of the MUs belonging to the spare area 602 is greater than or equal to the second threshold value, the MMC 502 can stop the data merging operation. It should be noted that, stopping the data merging operation refers to ending the data merging operation currently in process. After one data merging operation is stopped, if the total number of the MUs belonging to the spare area 602 is less than or equal to the first threshold value again, the next data merging operation can be executed again to try to release the new MUs.

Figure 7:
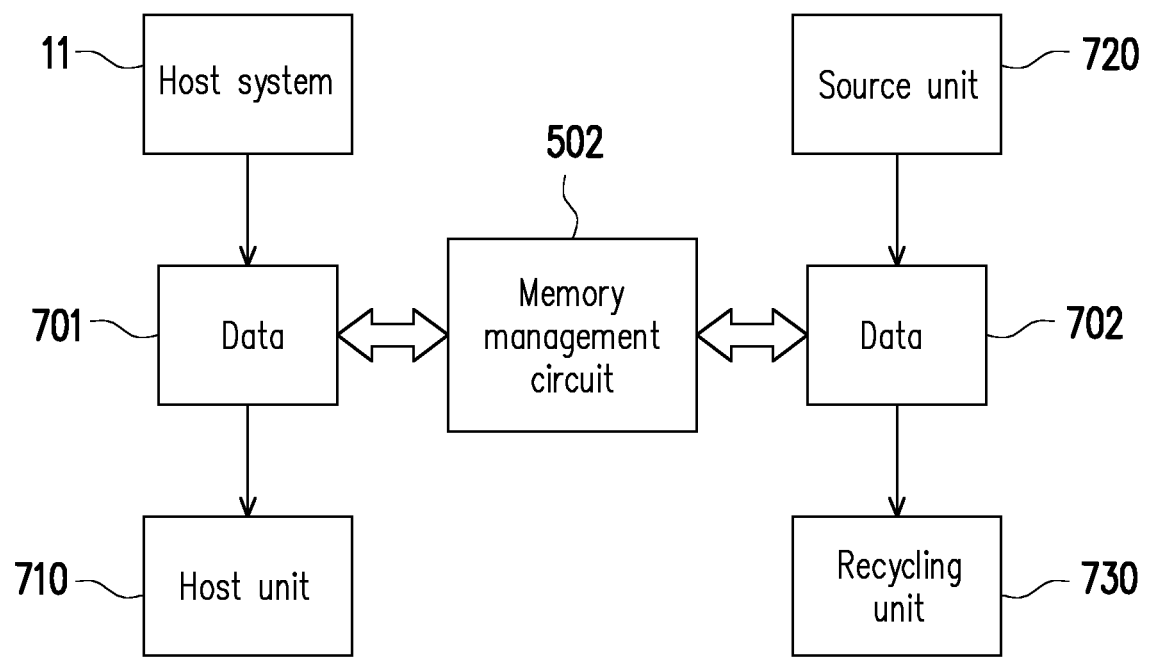
FIG. 7 is a schematic diagram illustrating a host writing operation and a data merging operation according to an exemplary embodiment of the disclosure.

FIG. 7 is a schematic diagram illustrating a host writing operation and a data merging operation according to an exemplary embodiment of the disclosure. Referring to FIG. 7, in the host writing operation, the host system 11 can send at least one write command as an instruction for writing data 701 into one or more LUs (or logical addresses). According to the write command, the MMC 502 can store the data 701 into a host unit 710 mapped to the LUs (or logical addresses). For example, the host unit 710 can contain one specific MU selected from the spare area 602 of FIG. 6.

On the other hand, the MMC 502 can initiate (e.g., activate) one data merging operation to release the new spare MU. For example, in the data merging operation, data 702 can be collected from at least one MU served as a source unit 720 and written into at least one MU served as a recycling unit 730. The data 702 includes the valid data stored in the source unit 720. If the valid data stored by one specific MU served as the source unit 720 is completely copied into the recycling unit 730, that specific MU can be erased to become the new spare MU. Accordingly, the number of the spare MUs in the spare area 602 of FIG. 6 can be gradually increased.

Figure 8A:
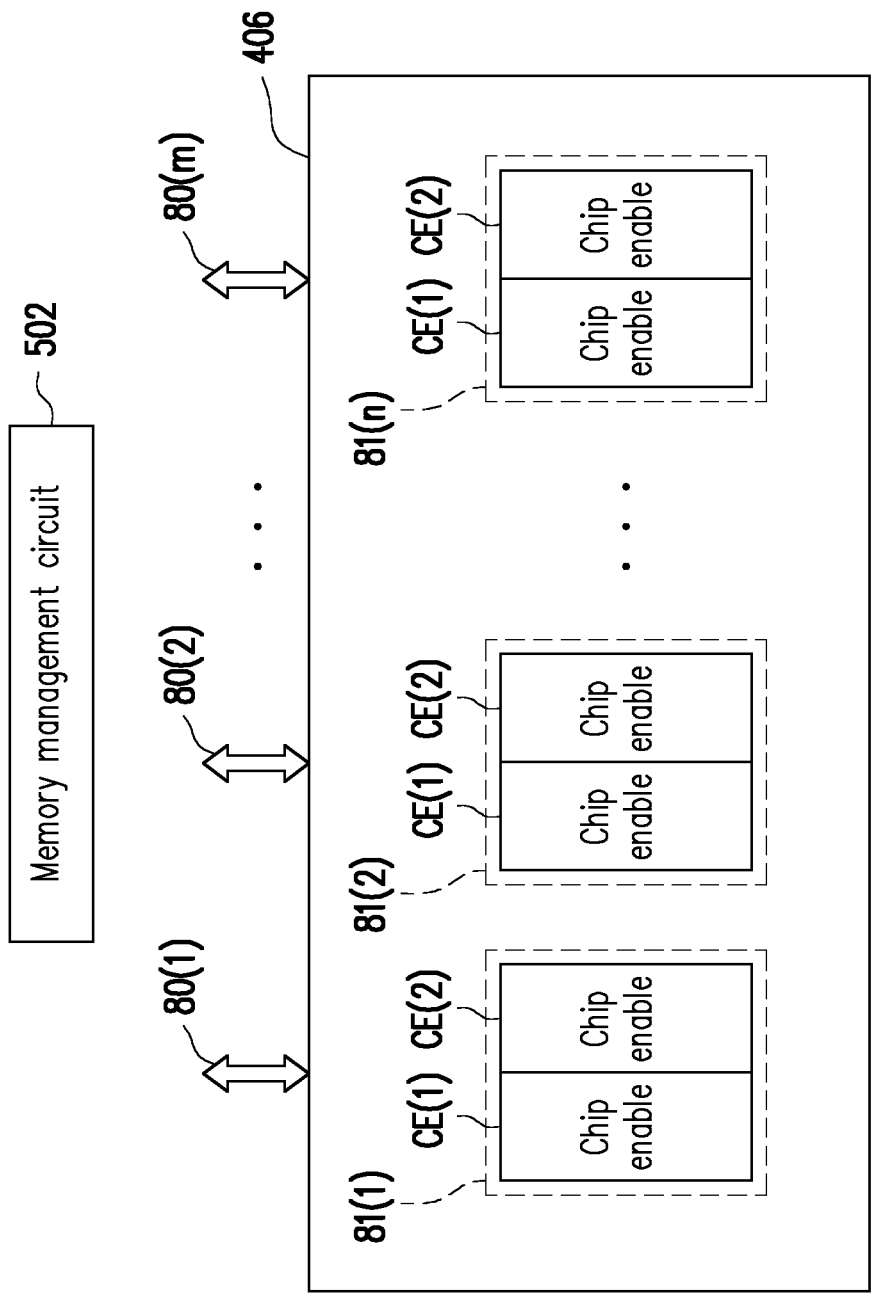
FIG. 8A is a schematic diagram illustrating management of a rewritable non-volatile memory module according to an exemplary embodiment of the disclosure.

FIG. 8A is a schematic diagram illustrating management of a RNVM module according to an exemplary embodiment of the disclosure. Referring to FIG. 8A, the RNVM module 406 includes MUs 81(1) to 81(n). Each of the MUs 81(1) to 81(n) contains chip enables (a.k.a. chip enable groups) CE(1) and CE(2). Each of the chip enables CE(1) and CE(2) contains a plurality of PNs. The MMC 502 can access the MUs 81(1) to 81(n) through channels 80(1) to 80(m). For example, the MMC 502 can access at least two MUs (e.g., the MUs 81(1) and 81(2)) among the MUs 81(1) to 81(n) in parallel (or interleavedly) through at least two channels among the channels 80(1) to 80(m).

Figure 8B:
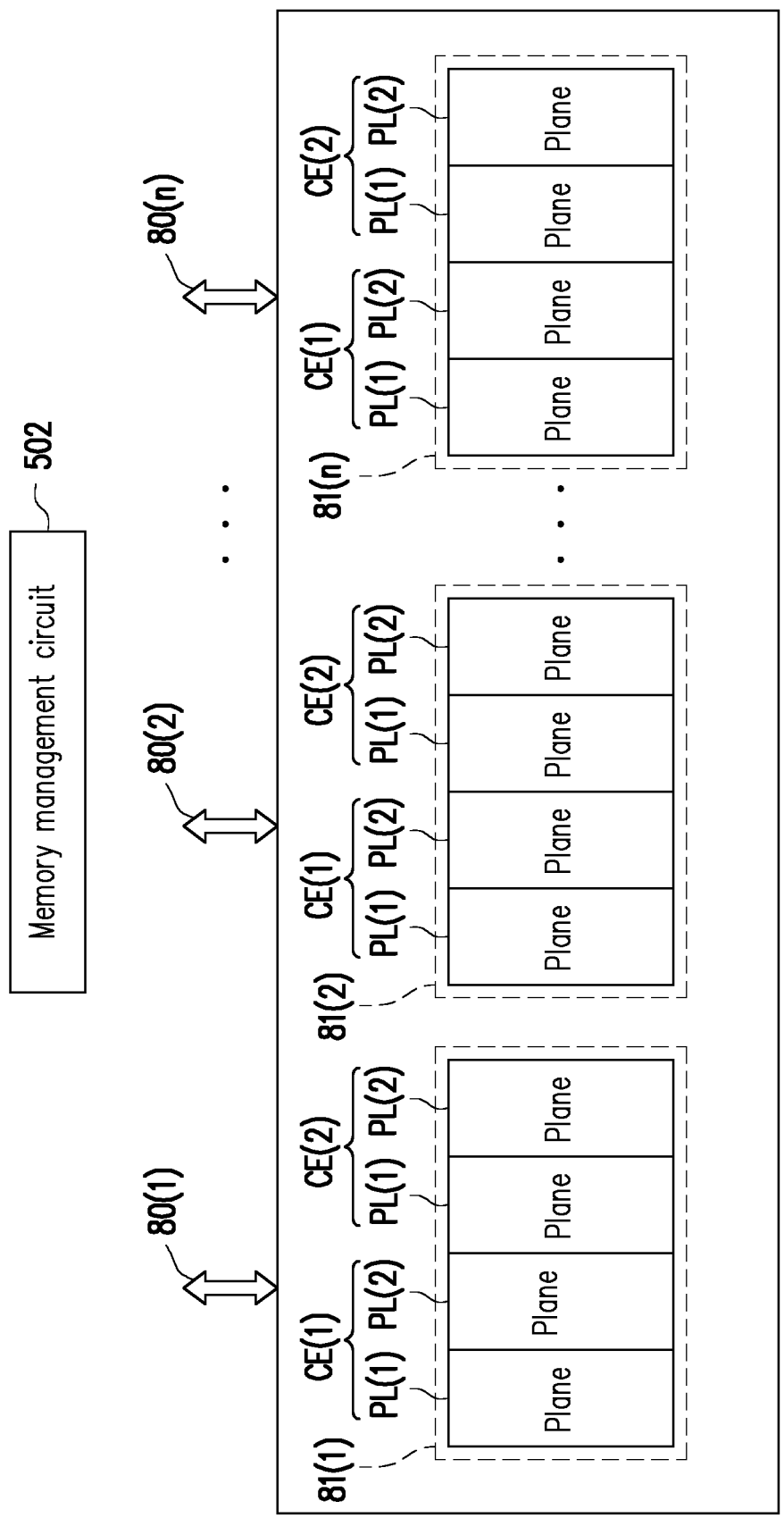
FIG. 8B is a schematic diagram illustrating management of a rewritable non-volatile memory module according to an exemplary embodiment of the disclosure.

FIG. 8B is a schematic diagram illustrating management of a RNVM module according to an exemplary embodiment of the disclosure. Referring to FIG. 8B, as compared to FIG. 8A, in this exemplary embodiment, each of the chip enables CE(1) is further divided into two planes PL(1) and PL(2), and each of the chip enables CE(2) is also divided into two planes PL(1) and PL(2). The planes PL(1) and PL(2) respectively include a plurality of PNs. The MMC 502 can access two, four or eight planes in the MU 81(1) in parallel (or interleavedly) through at least two channels among the channels 80(1) to 80(m).

In an exemplary embodiment, after the data merging operation is initiated, the MMC 502 can select the MU 81(1) (a.k.a. a first MU) as the source unit of the valid data (e.g., the source unit 720 of FIG. 7). Before the valid data is collected from the MU 81(1), the MU 502 can obtain counting information corresponding to the MU 81(1). This counting information may not reflect a data amount of the valid data in the MU 81(1).

In an exemplary embodiment, the counting information corresponding to the MU 81(1) can reflect a total number of at least one management table corresponding to the valid data (a.k.a. first data) in the MU 81(1). For example, each management table can include one logical-to-physical mapping table. Each management table can correspond to one logical range. For example, one logical range can contain a logical range to which a plurality of consecutive LUs among the LUs 612(0) to 612(D) of FIG. 6 belong. For example, if the management table corresponding to the first data includes a first management table and a second management table, the first management table can be used to record mapping information related to the LUs 612(0) to 612(3) of FIG. 6 and the second management table can be used to record mapping information related to the LUs 612(4) to 612(7) of FIG. 6. In addition, the management tables can be stored in the system area 603 of FIG. 6.

In the data merging operation, the MMC 502 can read the management tables corresponding to the first data from the system area 603 of FIG. 6. The MMC 502 can read the valid data (i.e., the first data) in the MU 81(1) according to the mapping information recorded by the read management tables.

In an exemplary embodiment, the MMC 502 can determine a mode for reading data of the MU 81(1) as a first mode (a.k.a. a first read mode) or a second mode (a.k.a. a second read mode) according to the counting information corresponding to the MU 81(1). If the mode for reading the data of the MU 81(1) is determined as the first mode, the MMC 502 can send a read command sequence (a.k.a. a first read command sequence) to instruct the RNVM module 406 to read the first data from the MU 81(1) according to a physical distribution of the first data. For example, the physical distribution of the first data can reflect a physical storage location of the first data in the MU 81(1). Alternatively, if the mode for reading the data of the MU 81(1) is determined as the second mode, the MMC 502 can send a read command sequence (a.k.a. a second read command sequence) to instruct the RNVM module 406 to read the first data from the MU 81(1) according to a logical distribution of the first data. For example, the logical distribution of the first data can reflect at least one logical range to which the first data belongs.

In an exemplary embodiment, if the mode for reading the data of the MU 81(1) is determined as the first mode, the MMC 502 can determine a read order (a.k.a. a first read order) of a plurality of PNs in the MU 81(1) according to the physical storage location of the first data in the MU 81(1). For example, these PNs respectively store a part of the data of the first data. Then, the MMC 502 can read the plurality of PNs according to the first read order to obtain the first data.

Figure 9:
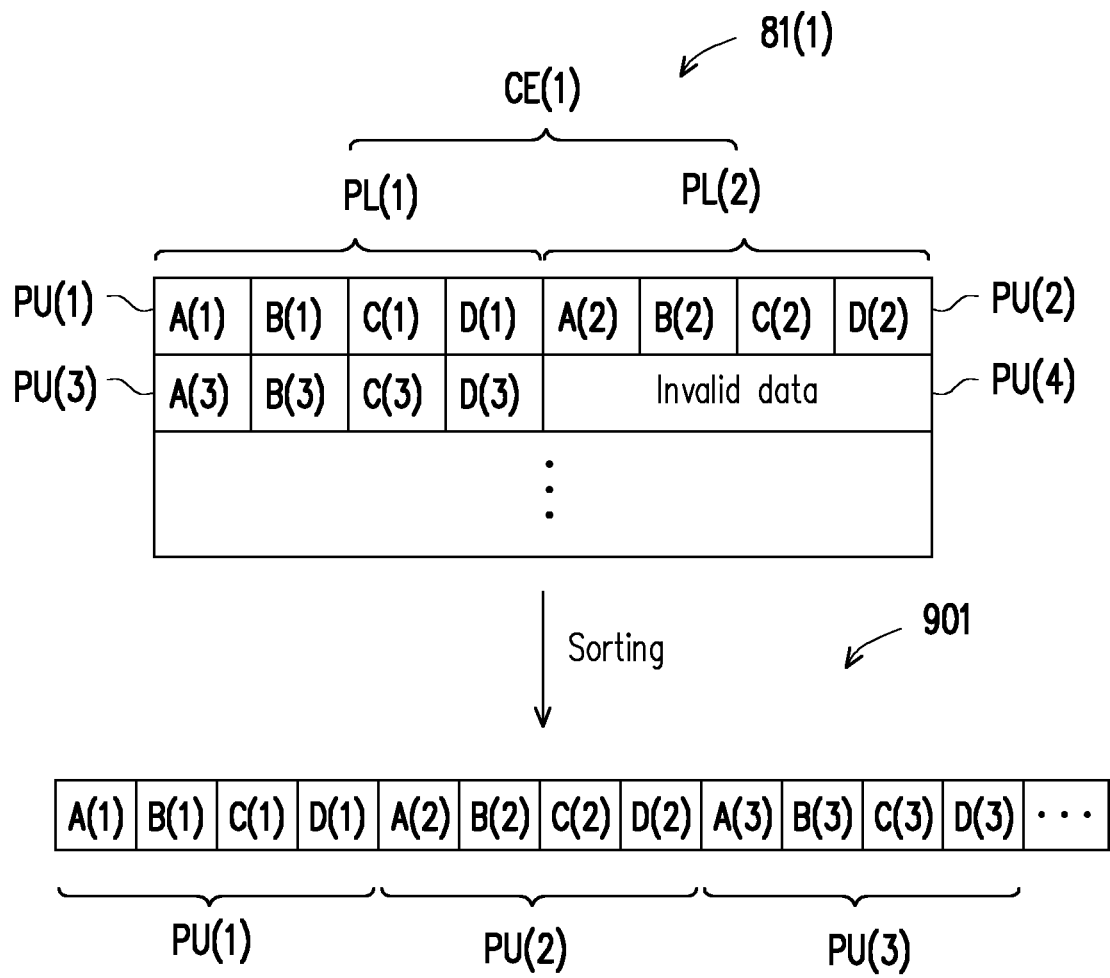
FIG. 9 is a schematic diagram for reading the first data based on the first mode illustrated according to an exemplary embodiment of the disclosure.

FIG. 9 is a schematic diagram for reading the first data based on the first mode illustrated according to an exemplary embodiment of the disclosure. Referring to FIG. 9, it is assumed that the chip enable CE(1) in the MU 81(1) at least includes PUs PU(1) to PU(4). The PUs PU(1) and PU(3) belong to the plane PL(1). The PUs PU(2) and PU(4) belong to the plane PL(2). In an exemplary embodiment, each of the PUs PU(1) to PU(4) can be regarded as one physical programming unit. However, in another exemplary embodiment, one physical programming unit can contain a plurality of cross-plane PUs (e.g., the PUs PU(1) and PU(2)).

In this exemplary embodiment, it is assumed that the first data to be collected includes data A(1) to D(1), A(2) to D(2) and A(3) to D(3). The data A(1) to D(1) are stored in a plurality of PNs in of the PU PU(1), respectively. The data A(2) to D(2) are stored in a plurality of PNs in of the PU PU(2), respectively. The data A(3) to D(3) are stored in a plurality of PNs in of the PU PU(3), respectively. In addition, the PU PU(4) is not stored with the valid data.

In this exemplary embodiment, in response to the mode for reading the data of the MU 81(1) determined as the first mode, a plurality of read command sequences for reading the first data can be sorted in a command queue 901 according to the physical storage location of the first data in the MU 81(1). The command queue 901 can be located in the buffer memory 510 of FIG. 5. For example, the determined read order (i.e., the first read order) can reflect that the data A(1) to D(1), A(2) to D(2) and A(3) to D(3) will be sequentially read from the PUs PU(1) to PU(3), as shown by FIG. 9. For example, the data A(1) to D(1) stored in the PU PU(1) and the data A(2) to D(2) stored in the PU PU(2) can be read in parallel. Subsequently, the data A(3) to D(3) stored in the PU PU(3) can be continuously read.

In an exemplary embodiment, if the mode for reading the data of the MU 81(1) is determined as the second mode, the MMC 502 can determine a read order (a.k.a. a second read order) of a plurality of PNs in the MU 81(1) according to at least one logical range to which the first data belongs. Then, the MMC 502 can read the plurality of PNs according to the second read order to obtain the first data.

Figure 10:
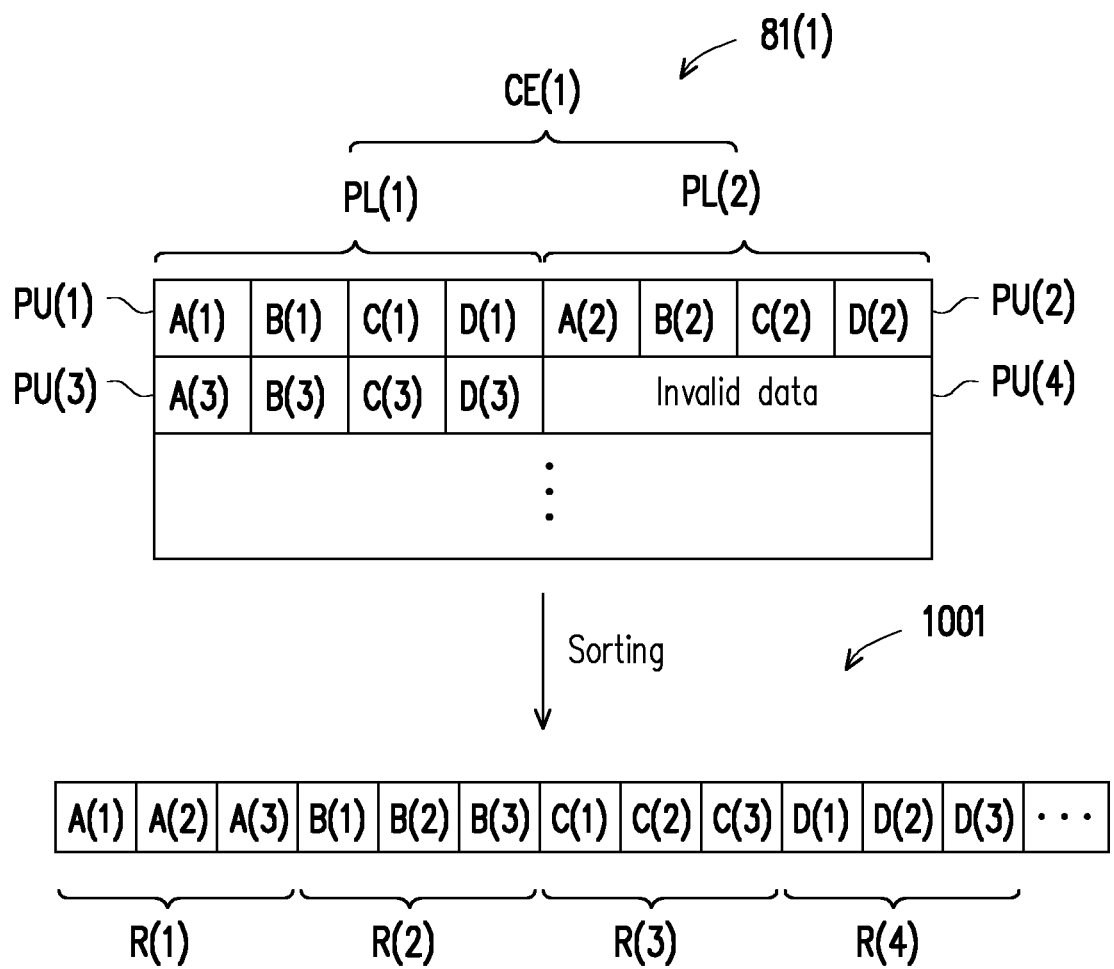
FIG. 10 is a schematic diagram for reading the first data based on the second mode illustrated according to an exemplary embodiment of the disclosure.

FIG. 10 is a schematic diagram for reading the first data based on the second mode illustrated according to an exemplary embodiment of the disclosure. Referring to FIG. 10, in this exemplary embodiment, it is also assumed that the first data to be collected includes data A(1) to D(1), A(2) to D(2) and A(3) to D(3). The data A(1) to D(1) are stored in a plurality of PNs in of the PU PU(1), respectively. The data A(2) to D(2) are stored in a plurality of PNs in of the PU PU(2), respectively. The data A(3) to D(3) are stored in a plurality of PNs in of the PU PU(3), respectively.

In this exemplary embodiment, in response to the mode for reading the data of the MU 81(1) determined as the second mode, a plurality of read command sequences for reading the first data can be sorted in a command queue 1001 according to the logical ranges to which each part of the data of the first data belongs. The command queue 1001 can be located in the buffer memory 510 of FIG. 5. For example, if the data A(1) to A(3) belong to a logical range R1, the data B(1) to B(3) belong to a logical range R2, the data C(1) to C(3) belong to a logical range R3 and the data D(1) to D(3) belong to a logical range R4, the determined read order (i.e., the second read order) can reflect that the data A(1) to A(3), B(1) to B(3), C(1) to C(3) and D(1) to D(3) will be sequentially read from the corresponding PNs, as shown by FIG. 10. For example, the data A(1) to A(3) belonging to the logical range R1 can be read first, then the data B(1) to B(3) belonging to the logical range R2 can be read, then the data C(1) to C(3) belonging to the logical range R3 can be read, and then the data D(1) to D(3) belonging to the logical range R4 can be read.

In an exemplary embodiment, if the logical ranges to which the first data to be collected in the MU 81(1) belongs are overly disperse (i.e., there are many management tables corresponding to the first data), the speed (or efficiency) of collecting the first data from the MU 81(1) based on the first mode should be higher than the speed (or efficiency) of collecting the first data from the MU 81(1) based on the second mode. However, in an exemplary embodiment, if the logical ranges to which the first data to be collected in the MU 81(1) belongs are relatively concentrated (i.e., there are less management tables corresponding to the first data), the speed (or efficiency) of collecting the first data from the MU 81(1) based on the second mode should be higher than the speed (or efficiency) of collecting the first data from the MU 81(1) based on the first mode.

In an exemplary embodiment, the counting information can reflect a data dispersion degree of the first data to be collected in the MU 81(1). For example, this data dispersion degree can refer to a degree of dispersion of the logical ranges (or the LUs) to which the first data belongs. In an exemplary embodiment, the MMC 502 can determine the mode for reading the first data as the first mode or the second mode according to the data dispersion degree of the first data.

In an exemplary embodiment, the MMC 502 can determine the counting information corresponding to the MU 81(1) according to the total number of the at least one management table corresponding to the first data. For example, this counting information may be equal to or positively correlated to the total number of the at least one management table corresponding to the first data. The MMC 502 can determine whether the counting information corresponding to the MU 81(1) is greater than a threshold value. If the counting information corresponding to the MU 81(1) is greater than the threshold value, the MMC 502 can determine the mode for reading the data of the MU 81(1) as the first mode. Alternatively, if the counting information corresponding to the MU 81(1) is not greater than (e.g., equal to or less than) the threshold value, the MMC 502 can determine the mode for reading the data of the MU 81(1) as the second mode.

In an exemplary embodiment, the MMC 502 can determine the threshold value according to a total number of all the PNs in the MU 81(1). For example, the threshold value may be equal to or positively correlated to the total number of all the PNs in the MU 81(1). In an exemplary embodiment, the MMC 502 can multiply the total number of all the PNs in the MU 81(1) by a scale value to obtain the threshold value. For example, if the MU 81(1) includes 6144 PNs in total, the MMC 502 can multiply 6144 by the scale value (e.g., 80%) to obtain the threshold value (e.g., 4915). Further, the scale value may also be other values (e.g., 70% or 90%), which are not particularly limited by the disclosure.

In an exemplary embodiment, the MMC 502 can obtain table bit map information corresponding to the first MU. Taking the MU 81(1) as an example, the table bit map information corresponding to the MU 81(1) can be stored in one specific PU in the MU 81(1). The table bit map information can reflect the logical range to which the valid data (i.e., the first data) currently stored in the MU 81(1) belongs. For example, the table bit map information can record a plurality of bits, and each of the bits corresponds to one logical range (or one management table (e.g., the logical-to-physical mapping table)).

If one specific bit in the table bit map information is a first bit (e.g., a bit of "1"), it indicates that the logical range to which the first data belongs contain the logical range corresponding to that specific bit. Later, when the first data is to be read from the first MU, the management table (e.g., the logical-to-physical mapping table) corresponding to that logical range can be accessed to obtain the mapping information required for accessing the first data. Further, if one specific bit in the table bit map information is not the first bit (e.g., a bit of "0"), it indicates that the logical range to which the first data belongs do not contain the logical range corresponding to that specific bit. Later, when the first data is to be read from the first MU, the management table (e.g., the logical-to-physical mapping table) corresponding to that logical range may not be accessed. In other words, a total number of the first bits in the table bit map information can reflect a distribution status of the logical range to which the first data belongs and/or the total number of the management tables corresponding to the first data.

In an exemplary embodiment, the MMC 502 can count the total number of the first bit(s) in the table bit map information. The MMC 502 can determine the counting information corresponding to the first MU according to the total number of the first bit(s). The greater a value of the counting information is, the more disperse the logical ranges to which the first data in the first MU belongs are. Therefore, as similar to the exemplary embodiment of FIG. 9, the first data in the first MU being read based on the first mode can provide the more preferable efficiency. Conversely, the smaller a value of the counting information is, the more concentrated the logical range to which the first data in the first MU belongs are. Therefore, as similar to the exemplary embodiment of FIG. 10, the first data in the first MU being read based on the second mode can provide the more preferable efficiency.

In an exemplary embodiment, after the first data is read, the MMC 502 can also send a write command sequence to instruct the RNVM module 406 to program the read first data into at least one MU served as the recycling unit according to the determined mode for reading the data. For example, the MMC 502 can select the MU 81(2) from the spare area 602 of FIG. 6 as the recycling unit to store the valid data collected through the data merging operation. In addition, after the first data is completely collected, the MMC 502 can send an erase command sequence to instruct the RNVM module 406 to erase the first MU. The erased first MU can be released as a new spare MU.

Figure 11:
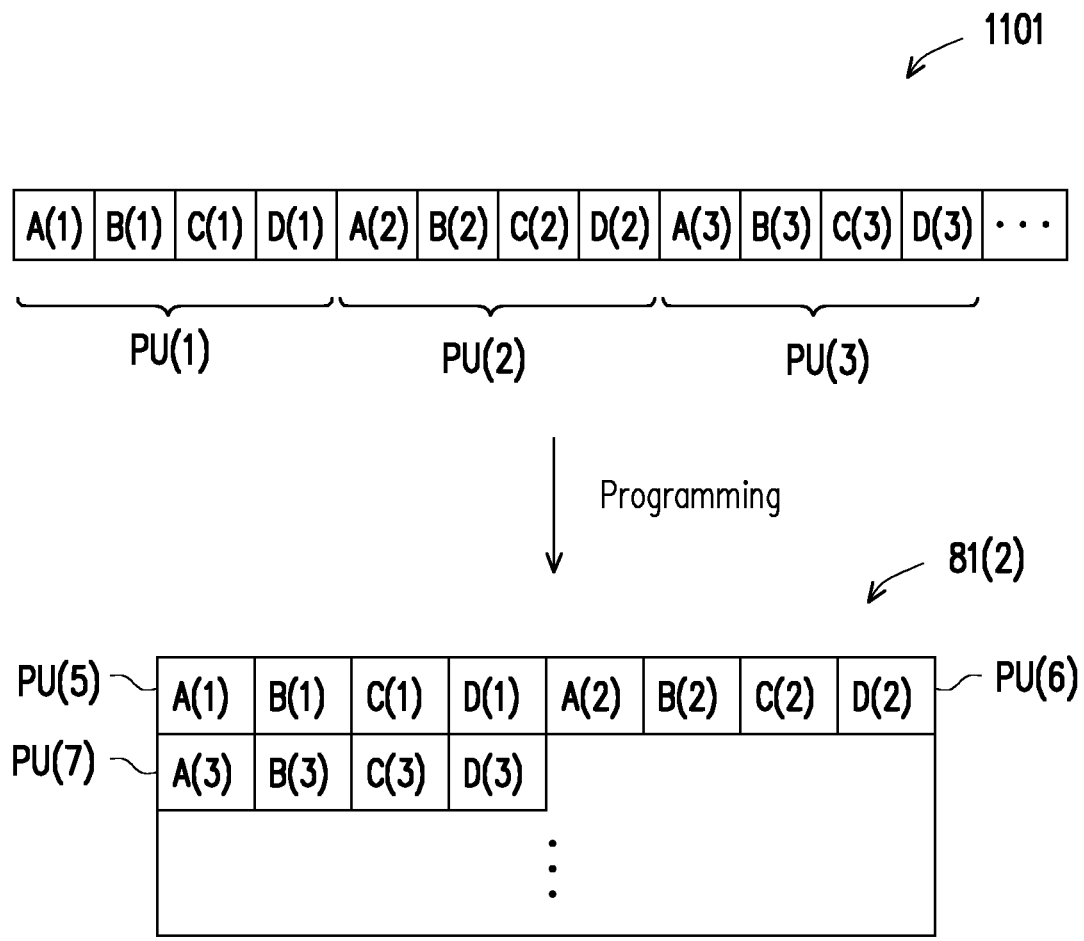
FIG. 11 is a schematic diagram for storing the first data based on the first mode illustrated according to an exemplary embodiment of the disclosure.

FIG. 11 is a schematic diagram for storing the first data based on the first mode illustrated according to an exemplary embodiment of the disclosure. Referring to FIG. 11, continuing from the exemplary embodiment of FIG. 9, the first data collected from the first MU based on the first mode can be sorted in a buffer area 1101 according to the first read order. The buffer area 1101 can be located in the buffer memory 510 of FIG. 5. Next, the first data in the buffer area 1101 can also be programmed into the PUs PU(5), PU(6) and PU(7) in the MU 81(2) according to the first read order.

Figure 12:
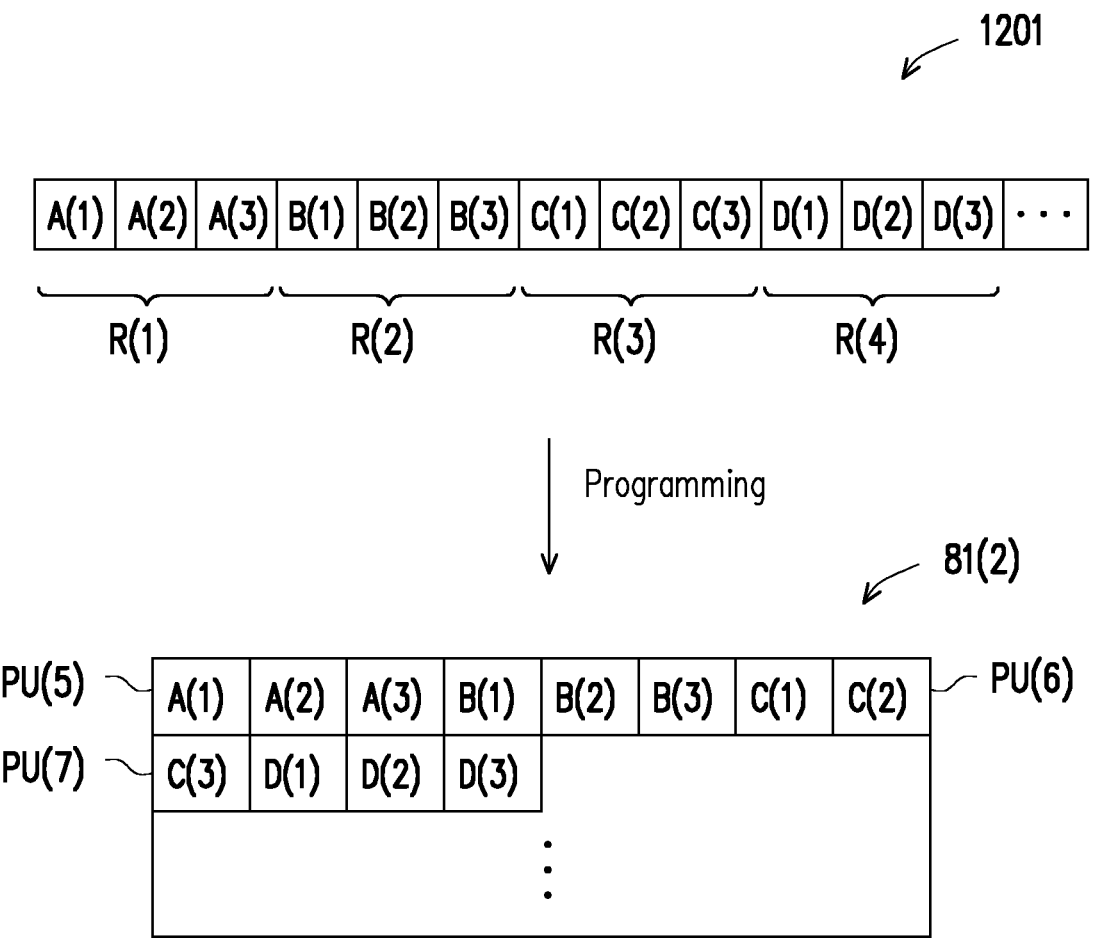
FIG. 12 is a schematic diagram for storing the first data based on the second mode illustrated according to an exemplary embodiment of the disclosure.

FIG. 12 is a schematic diagram for storing the first data based on the second mode illustrated according to an exemplary embodiment of the disclosure. Referring to FIG. 12, continuing from the exemplary embodiment of FIG. 10, the first data collected from the first MU based on the second mode can be sorted in a buffer area 1201 according to the second read order. The buffer area 1201 can be located in the buffer memory 510 of FIG. 5. Next, the first data in the buffer area 1201 can also be programmed into the PUs PU(5), PU(6) and PU(7) in the MU 81(2) according to the second read order.

Figure 13:
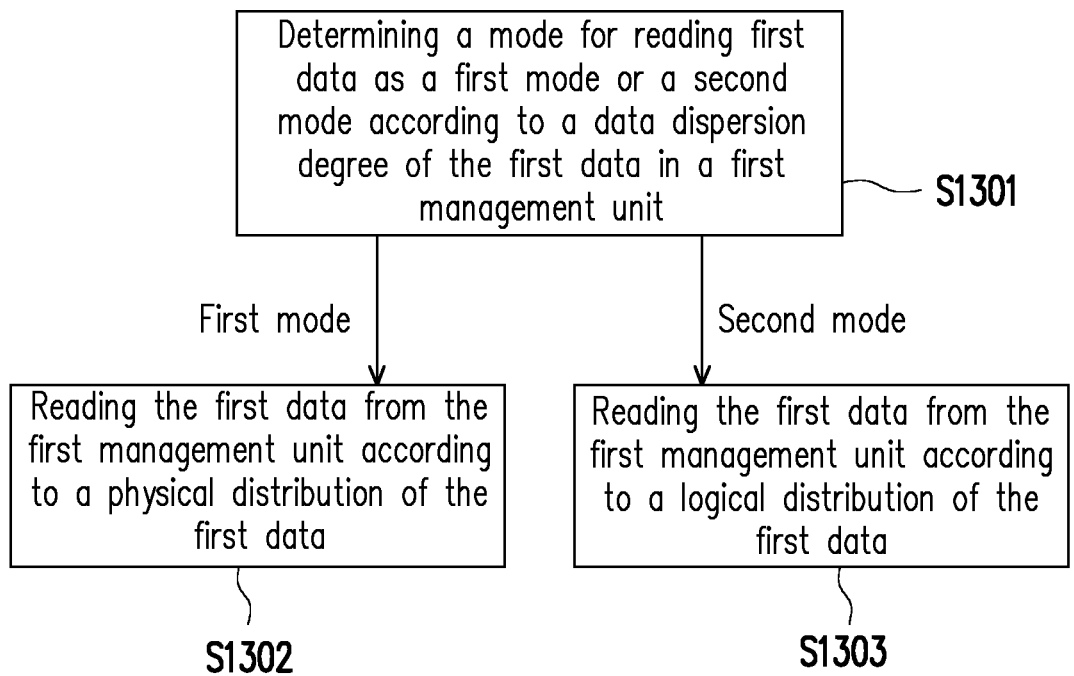
FIG. 13 is a flowchart illustrating a memory control method according to an exemplary embodiment of the disclosure.

FIG. 13 is a flowchart illustrating a memory control method according to an exemplary embodiment of the disclosure. Referring to FIG. 13, in step S1301, a mode for reading first data in a first MU is determined as a first mode or a second mode according to a data dispersion degree of the first data. If the mode for reading the first data is determined as the first mode, in step S1302, the first data is read from the first MU according to a physical distribution of the first data. If the mode for reading the first data is determined as the second mode, in step S1303, the first data is read from the first MU according to a logical distribution of the first data.

Figure 14:
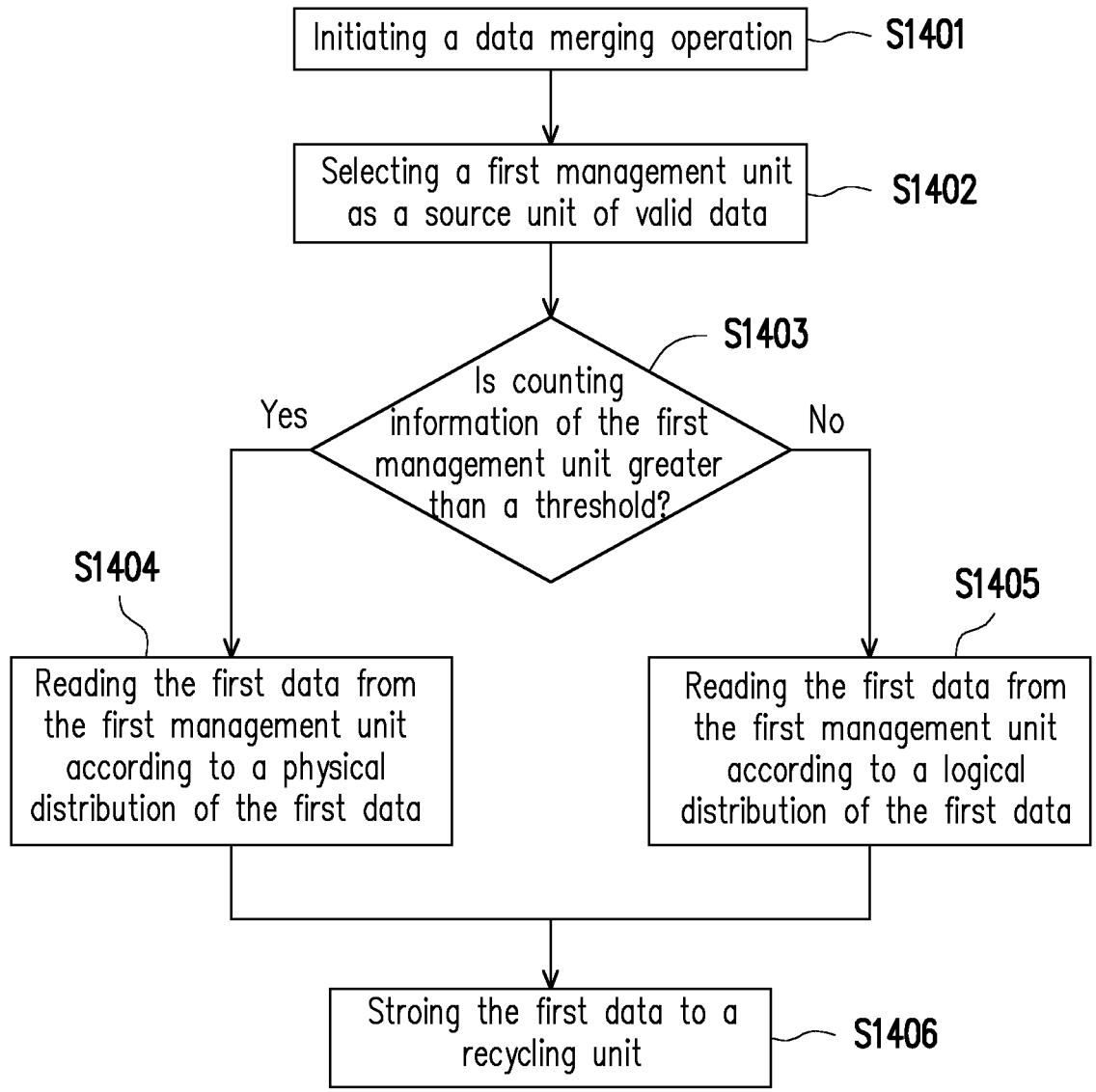
FIG. 14 is a flowchart illustrating a memory control method according to an exemplary embodiment of the disclosure.

FIG. 14 is a flowchart illustrating a memory control method according to an exemplary embodiment of the disclosure. Referring to FIG. 14, in step S1401, a data merging operation is initiated (e.g., activated). In step S1402, a first MU is selected as a source unit of valid data. In step S1403, whether counting information of the first MU is greater than a threshold value is determined. The counting information can reflect a data dispersion degree of the first data and/or a total number of the management tables corresponding to the first data. If the counting information of the first MU is greater than the threshold value, in step S1404, the mode for reading the first data is determined as the first mode, and the first data is read from the first MU according to a physical distribution of the first data. If the counting information of the first MU is not greater than the threshold value, in step S1405, the mode for reading the first data is determined as the second mode, and the first data is read from the first MU according to a logical distribution of the first data. In step S1406, the collected first data is stored to a second MU served as a recycling unit, and the first MU is then erased.

Nevertheless, each of steps depicted in FIG. 13 and FIG. 14 have been described in detail as above, thus related description thereof is not repeated hereinafter. It should be noted that, the steps depicted in FIG. 13 and FIG. 14 may be implemented as a plurality of program codes or circuits, which are not particularly limited in the disclosure. Moreover, the methods disclosed in FIG. 13 and FIG. 14 may be implemented with reference to above embodiments, or may be implemented separately, which are not particularly limited in the disclosure.

In summary, by dynamically determining which mode to be used for collecting the valid data, regardless of what logical distribution of the valid data to be collected in the first MU is, the efficiency of reading the valid data in the data merging operation can be increased.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory control method for a rewritable non-volatile memory module, wherein the rewritable non-volatile memory module comprises a plurality of management units, and the memory control method comprises:
    determining a mode for reading first data in a first management unit among the plurality of management units as a first mode or a second mode according to a data dispersion degree of the first data;
    reading the first data from the first management unit according to a physical distribution of the first data if the mode for reading the first data is determined as the first mode; and
    reading the first data from the first management unit according to a logical distribution of the first data if the mode for reading the first data is determined as the second mode,
    wherein the step of determining the mode for reading the first data as the first mode or the second mode according to the data dispersion degree of the first data comprises:
    determining the mode for reading the first data as the first mode or the second mode according to counting information, wherein the counting information reflects a total number of at least one management table corresponding to the first data,
    wherein the step of determining the mode for reading the first data as the first mode or the second mode according to the counting information comprises:
    determining the mode for reading the first data as the first mode if the counting information is greater than a threshold value; and
    determining the mode for reading the first data as the second mode if the counting information is less than the threshold value.

2. The memory control method according to claim 1, wherein the step of reading the first data from the first management unit according to the physical distribution of the first data comprises:
    determining a first read order of a plurality of physical nodes in the first management unit according to a physical storage location of the first data in the first management unit; and
    reading the plurality of physical nodes according to the first read order to obtain the first data.

3. The memory control method according to claim 2, wherein the step of reading the first data from the first management unit according to the logical distribution of the first data comprises:
    determining a second read order of the plurality of physical nodes according to at least one logical range to which the first data belongs; and
    reading the plurality of physical nodes according to the second read order to obtain the first data.

4. The memory control method of claim 1, further comprising:
    determining the threshold value according to a total number of physical nodes in the first management unit.

5. The memory control method of claim 1, further comprising:
    obtaining table bit map information corresponding to the first management unit;
    counting a total number of a first bit in the table bit map information; and
    determining the counting information according to the total number of the first bit.

6. The memory control method of claim 1, further comprising:
    after the first data is read, programming the read first data into a second management unit among the plurality of management units according to the mode for reading the first data; and
    erasing the first management unit.

7. A memory storage device, comprising:
    a connection interface unit, configured to couple to a host system;
    a rewritable non-volatile memory module, wherein the rewritable non-volatile memory module comprises a plurality of management units; and
    a memory control circuit unit, coupled to the connection interface unit and the rewritable non-volatile memory module,
    wherein the memory control circuit unit is configured to determine a mode for reading first data in a first management unit among the plurality of management units as a first mode or a second mode according to a data dispersion degree of the first data,
    the memory control circuit unit is further configured to send a first read command sequence to instruct a reading of the first data from the first management unit according to a physical distribution of the first data if the mode for reading the first data is determined as the first mode, and
    the memory control circuit unit is further configured to send a second read command sequence to instruct a reading of the first data from the first management unit according to a logical distribution of the first data if the mode for reading the first data is determined as the second mode,
    wherein the operation that the memory control circuit unit determines the mode for reading the first data as the first mode or the second mode according to the data dispersion degree of the first data comprises:
    determining the mode for reading the first data as the first mode or the second mode according to counting information, wherein the counting information reflects a total number of at least one management table corresponding to the first data,
    wherein the operation that the memory control circuit unit determines the mode for reading the first data as the first mode or the second mode according to the counting information comprises:
    determining the mode for reading the first data as the first mode if the counting information is greater than a threshold value; and
    determining the mode for reading the first data as the second mode if the counting information is less than the threshold value.

8. The memory storage device according to claim 7, wherein the operation that the memory control circuit unit sends the first read command sequence to instruct the reading of the first data from the first management unit according to the physical distribution of the first data comprises:
    determining a first read order of a plurality of physical nodes in the first management unit according to a physical storage location of the first data in the first management unit; and
    reading the plurality of physical nodes according to the first read order to obtain the first data.

9. The memory storage device according to claim 8, wherein the operation that the memory control circuit unit sends the second read command sequence to instruct reading the first data from the first management unit according to the logical distribution of the first data comprises:
  determining a second read order of the plurality of physical nodes according to at least one logical range to which the first data belongs; and
  reading the plurality of physical nodes according to the second read order to obtain the first data.

10. The memory storage device according to claim 7, wherein the memory control circuit unit is further configured to determine the threshold value according to a total number of physical nodes in the first management unit.

11. The memory storage device according to claim 7, wherein the memory control circuit unit is further configured to:
  obtain table bit map information corresponding to the first management unit;
  count a total number of a first bit in the table bit map information; and
  determine the counting information according to the total number of the first bit.

12. The memory storage device according to claim 7, wherein the memory control circuit unit is further configured to send a write command sequence to instruct a programming of the read first data into a second management unit among the plurality of management units according to the mode for reading the first data after the first data is read, and
  the memory control circuit unit is further configured to send an erase command sequence to instruct an erasing of the first management unit.

13. A memory control circuit unit for controlling a rewritable non-volatile memory module, wherein the rewritable non-volatile memory module comprises a plurality of management units, and the memory control circuit unit comprises:
  a host interface, configured to couple to a host system;
  a memory interface, configured to couple to the rewritable non-volatile memory module; and
  a memory management circuit, coupled to the host interface and the memory interface,
  wherein the memory management circuit is configured to determine a mode for reading first data in a first management unit among the plurality of management units as a first mode or a second mode according to a data dispersion degree of the first data,
  the memory management circuit is further configured to send a first read command sequence to instruct a reading of the first data from the first management unit according to a physical distribution of the first data if the mode for reading the first data is determined as the first mode, and
  the memory management circuit is further configured to send a second read command sequence to instruct a reading of the first data from the first management unit according to a logical distribution of the first data if the mode for reading the first data is determined as the second mode,
  wherein the operation that the memory management circuit determines the mode for reading the first data as the first mode or the second mode according to the data dispersion degree of the first data comprises:
  determining the mode for reading the first data as the first mode or the second mode according to counting information, wherein the counting information reflects a total number of at least one management table corresponding to the first data,
  wherein the operation that the memory management circuit determines the mode for reading the first data as the first mode or the second mode according to the counting information comprises:
  determining the mode for reading the first data as the first mode if the counting information is greater than a threshold value; and
  determining the mode for reading the first data as the second mode if the counting information is less than the threshold value.

14. The memory control circuit unit according to claim 13, wherein the operation that the memory management circuit sends the first read command sequence to instruct the reading of the first data from the first management unit according to the physical distribution of the first data comprises:
  determining a first read order of a plurality of physical nodes in the first management unit according to a physical storage location of the first data in the first management unit; and
  reading the plurality of physical nodes according to the first read order to obtain the first data.

15. The memory control circuit unit according to claim 14, wherein the operation that the memory management circuit sends the second read command sequence to instruct the reading of the first data from the first management unit according to the logical distribution of the first data comprises:
  determining a second read order of the plurality of physical nodes according to at least one logical range to which the first data belongs; and
  reading the plurality of physical nodes according to the second read order to obtain the first data.

16. The memory control circuit unit according to claim 13, wherein the memory management circuit is further configured to determine the threshold value according to a total number of physical nodes in the first management unit.

17. The memory control circuit unit according to claim 13, wherein the memory management circuit is further configured to:
  obtain table bit map information corresponding to the first management unit;
  count a total number of a first bit in the table bit map information; and
  determine the counting information according to the total number of the first bit.

18. The memory control circuit unit according to claim 13, wherein the memory management circuit is further configured to send a write command sequence to instruct a programming of the read first data into a second management unit among the plurality of management units according to the mode for reading the first data after the first data is read, and
  the memory management circuit is further configured to send an erase command sequence to instruct an erasing of the first management unit.

19. A memory control method for a rewritable non-volatile memory module, wherein the rewritable non-volatile memory module comprises a plurality of management units, and the memory control method comprises:
  determining a mode for reading first data in a first management unit among the plurality of management units as a first mode or a second mode according to a data dispersion degree of the first data;
  reading the first data from the first management unit according to a physical distribution of the first data if the mode for reading the first data is determined as the first mode; and reading the first data from the first management unit according to a logical distribution of the first data if the mode for reading the first data is determined as the second mode, wherein the step of determining the mode for reading the first data as the first mode or the second mode according to the data dispersion degree of the first data comprises:

determining the mode for reading the first data as the first mode or the second mode according to counting information, wherein the counting information reflects a total number of at least one management table corresponding to the first data, wherein the memory control method further comprises:

obtaining table bit map information corresponding to the first management unit;

counting a total number of a first bit in the table bit map information; and determining the counting information according to the total number of the first bit.

20. A memory storage device, comprising:

a connection interface unit, configured to couple to a host system;

a rewritable non-volatile memory module, wherein the rewritable non-volatile memory module comprises a plurality of management units; and a memory control circuit unit, coupled to the connection interface unit and the rewritable non-volatile memory module, wherein the memory control circuit unit is configured to determine a mode for reading first data in a first management unit among the plurality of management units as a first mode or a second mode according to a data dispersion degree of the first data, the memory control circuit unit is further configured to send a first read command sequence to instruct a reading of the first data from the first management unit according to a physical distribution of the first data if the mode for reading the first data is determined as the first mode, and the memory control circuit unit is further configured to send a second read command sequence to instruct a reading of the first data from the first management unit according to a logical distribution of the first data if the mode for reading the first data is determined as the second mode, wherein the operation that the memory control circuit unit determines the mode for reading the first data as the first mode or the second mode according to the data dispersion degree of the first data comprises:

determining the mode for reading the first data as the first mode or the second mode according to counting information, wherein the counting information reflects a total number of at least one management table corresponding to the first data, wherein the memory control circuit unit is further configured to:

obtain table bit map information corresponding to the first management unit;

count a total number of a first bit in the table bit map information; and determine the counting information according to the total number of the first bit.

21. A memory control circuit unit for controlling a rewritable non-volatile memory module, wherein the rewritable non-volatile memory module comprises a plurality of management units, and the memory control circuit unit comprises:

a host interface, configured to couple to a host system;

a memory interface, configured to couple to the rewritable non-volatile memory module; and a memory management circuit, coupled to the host interface and the memory interface, wherein the memory management circuit is configured to determine a mode for reading first data in a first management unit among the plurality of management units as a first mode or a second mode according to a data dispersion degree of the first data, the memory management circuit is further configured to send a first read command sequence to instruct a reading of the first data from the first management unit according to a physical distribution of the first data if the mode for reading the first data is determined as the first mode, and the memory management circuit is further configured to send a second read command sequence to instruct a reading of the first data from the first management unit according to a logical distribution of the first data if the mode for reading the first data is determined as the second mode, wherein the operation that the memory management circuit determines the mode for reading the first data as the first mode or the second mode according to the data dispersion degree of the first data comprises:

determining the mode for reading the first data as the first mode or the second mode according to counting information, wherein the counting information reflects a total number of at least one management table corresponding to the first data, wherein the memory management circuit is further configured to:

obtain table bit map information corresponding to the first management unit;

count a total number of a first bit in the table bit map information; and determine the counting information according to the total number of the first bit.

* * * * *